United States Patent
Kaya

(10) Patent No.: US 8,555,697 B2
(45) Date of Patent: Oct. 15, 2013

(54) METHOD AND APPARATUS FOR FORMING THE CALIBRATION CHART FOR THE UNDERGROUND FUEL TANKS

(75) Inventor: Yusuf Kaya, Istanbul (TR)

(73) Assignee: Asis Akaryakit Servis Istasyon Sistemleri Ve Insaat Sanayi Ve Ticaret Limited Sirketi, Istanbul (TR)

( * ) Notice: Subject to any disclaimer, the term of this patent is extended or adjusted under 35 U.S.C. 154(b) by 327 days.

(21) Appl. No.: 12/682,709

(22) PCT Filed: Oct. 16, 2007

(86) PCT No.: PCT/TR2007/000123
§ 371 (c)(1),
(2), (4) Date: Apr. 12, 2010

(87) PCT Pub. No.: WO2009/051571
PCT Pub. Date: Apr. 23, 2009

(65) Prior Publication Data
US 2010/0212397 A1    Aug. 26, 2010

(51) Int. Cl.
*G01F 25/00* (2006.01)
(52) U.S. Cl.
USPC .............................. 73/1.73; 702/100; 702/55
(58) Field of Classification Search
USPC ................................................. 73/1.73, 1.16
See application file for complete search history.

(56) References Cited

U.S. PATENT DOCUMENTS

| | | | |
|---|---|---|---|
| 5,956,077 A * | 9/1999 | Qureshi et al. | 348/82 |
| 5,973,770 A * | 10/1999 | Carter et al. | 356/4.09 |
| 2008/0217874 A1* | 9/2008 | Miskin | 280/6.151 |
| 2008/0236275 A1* | 10/2008 | Breed et al. | 73/290 V |

FOREIGN PATENT DOCUMENTS

| | | | | |
|---|---|---|---|---|
| JP | 01136028 A | * | 5/1989 | |
| JP | 10206209 A | * | 8/1998 | |
| JP | 2000313240 A | * | 11/2000 | |
| JP | 2011169880 A | * | 9/2011 | |
| SU | 1569565 A | * | 6/1990 | |

\* cited by examiner

*Primary Examiner* — Hezron E Williams
*Assistant Examiner* — Nashimya Fayyaz
(74) *Attorney, Agent, or Firm* — Wood, Phillips, Katz, Clark & Mortimer

(57) ABSTRACT

The invention relates to the method and apparatus for forming the calibration chart used to measure the amount of fuel inside the fuel tanks (1) which comprises at least one laser distance measurement device (2) positioned inside said fuel tank (1) and measuring the distance between itself and the inner wall of said fuel tank (1) at separate points, at least one main shaft (14) providing said distance measurement device (2) with rotational movement circularly in the direction of B through up to 360 degrees and in the upward-downward direction of A through up to 270 degrees and at least one inclinometer (4) positioned on the surface (9) and measuring the angle X between said fuel tank (1) and the ground on which it is located.

19 Claims, 1 Drawing Sheet

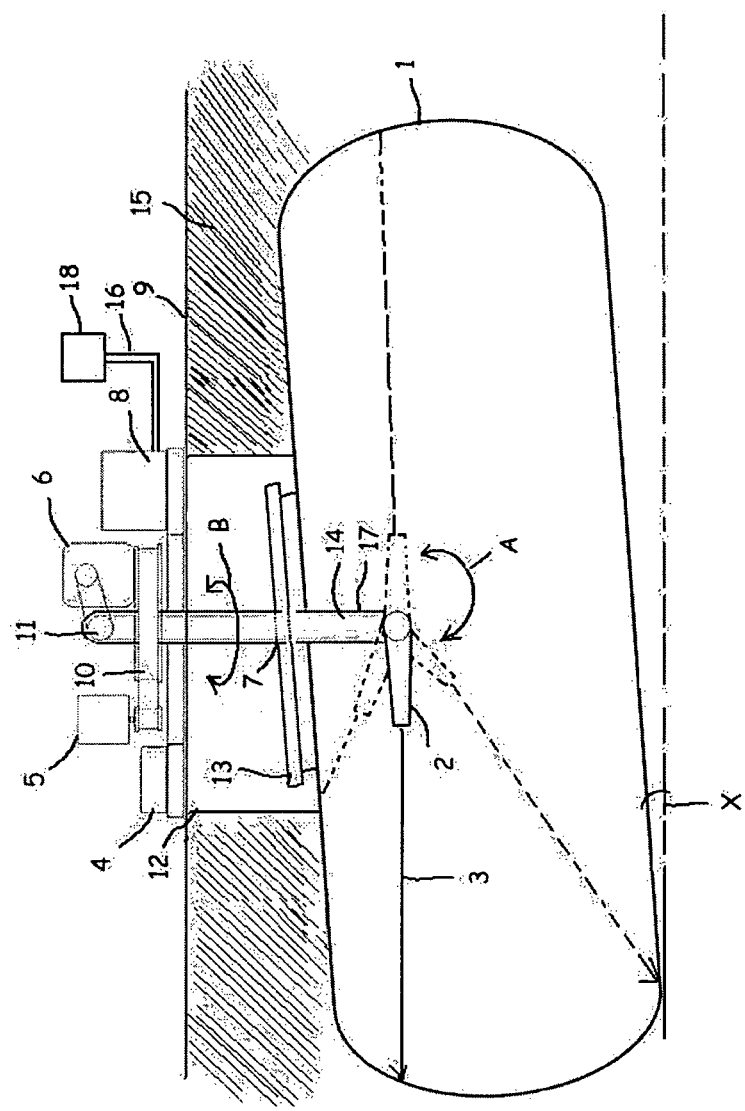

METHOD AND APPARATUS FOR FORMING THE CALIBRATION CHART FOR THE UNDERGROUND FUEL TANKS

TECHNICAL FIELD

The invention relates to the determination of the fuel level and amount inside the underground liquid fuel tanks in the gas stations.

The invention relates in particular to forming the calibration charts used in order to determine the fuel level and amount inside the underground liquid fuel tanks in the gas stations, wherein the error margin is minimized.

BACKGROUND OF THE INVENTION

In the gas stations, various methods are employed to measure the level of oil inside the underground fuel tanks. Such methods may be carried out manually by dipping the level measurement sticks in the tank, as well as automatically with the help of the electronic measurement sensors placed into the tank.

In all the said methods, the calculation is made for the amount of liters that the level measured in millimeters corresponds to. Said calculation is made using the calibration chart previously prepared for the fuel tank. The calibration chart shows the height of the fuel inside the tank and the volume value corresponding to the same. The height of the fuel inside the tank is calculated by means of the aforesaid methods and it is proportioned with respect to the tank volume, in order to determine the fuel amount (volume).

In order to perform this calculation accurately, the calibration chart (mm/lt) of the fuel tank must be correct. Otherwise, the measured millimeter value will not yield the correct value in liters.

The calibration charts for the fuel tanks are generally drawn up during the production thereof. However, the chart is suitable for the ideal conditions and when the tank is placed underground, it deviates from said ideal conditions and the calibration chart of the tank becomes erroneous.

In this case, it is necessary to carry out the tank calibration again, in order to obtain an accurate result when the level measurement system is installed in the tank or when a manual measurement is performed. This is a difficult and costly work.

In order to carry out the calibration, the fuel inside the tank is emptied and millimeter measurement is made by stage wise filling of the fuel. For this system, the equipment such as one or two fuel tankers and the fuel transfer pump are used in the station and it may take hours to complete the calibration for one tank.

During said period of time, the operation of the station must be ceased in a stage wise manner and no sale must be conducted. Manual calibration is labor intensive and costly, in addition to its hindering the overall functioning of the station.

Another calibration method is carried out in an automatic manner by means of the calibration software and automation systems in the systems having the tank automation system and the pump automation system. With the automatic calibration initiated after the tanks are completely filled, the system compares the mm value it receives from the tank automation to the amount of fuel sold at the pumps, to prepare the calibration chart for the tank.

In order for this system to function accurately, it is necessary to wait for the tanks to become completely empty and there must no intervention in the meantime; also, in order to form a correct and complete chart, one needs to wait for the tank to be filled and emptied for several times.

In such automation systems, it is necessary to completely fill several times the expensive tanks with an average capacity of 20.000 lt. This situation leads to a high cost and a long duration of time. Also, as the durations become very long in the stations with a low rate of sale, difficulties are encountered in obtaining the correct results.

Today, in the PCT document no. WO2007078221 titled "the calibration method and apparatus for the determination of the amount of liquid inside the tank", the invention disclosed relates to measuring and calibrating the fuel level inside a fuel tank by means of a fuel sensor. In said application, the amount of fuel inside the tank is measured according to the calibration value that corresponds to said fuel level.

However, when said tank is placed in an area that is not smooth according to this practice, said fuel levels appear with a value below or above the actual one with a certain inclination and the desired actual amount of fuel may not be reached.

Similarly, the EPC application no. EP1603826 titled "the measurement system for the underground liquid fuel tanks in the gas stations" relates to the system, which measures the amount of the fuel withdrawn from the liquid fuel tanks located underground of the gas stations. Here the measurement procedure is carried out by means of the turbine pump dipped into the tank. Amount of the fuel drawn by the gas pump is measured, and thus the amount of the remaining fuel may be calculated.

Unfortunately, it is also necessary in this practice to wait until the complete emptying of the tanks and there must no intervention meanwhile, in order for the system to function accurately.

Further according to the state of the art, in the patent document no. US2003230141 titled "optical fuel level sensor", the variation in the fuel level is determined by means of an electronic level detection sensor.

Also in said practice, difficulties are encountered in eliminating the aforesaid disadvantages.

Due to the aforementioned disadvantages, the effort has been made in search of an innovation in the calibration method used to measure the fuel amount in the liquid fuel tanks.

DESCRIPTION OF THE INVENTION

Based on the mentioned state of the art, the object of the invention is to propose a method, which, regardless of the angle at which the liquid fuel tank is placed on the ground, is capable of calibrating the actual value of the fuel amount inside the tank in a faster and more accurate manner as compared to the other systems.

Another object of the invention is to propose a structure, which provides a much more accurate and realistic calibration owing to the laser measurement instrument.

Another object of the invention is to propose a structure, which enables the calibration procedure to be carried out in a very short time and the calibration chart to be prepared easily.

Another object of the invention is to propose a structure with a much lower cost for the formation of the calibration chart.

Still another object of the invention is to provide that the calibration chart is prepared by means of the formation of the 3D (three dimensional) space points via laser measurement inside the tank and of 3D modeling of the inside of the tank.

Still another object of the invention is to make it possible to also detect the dents and shape distortions on the tank, which are not possible to realize via the existing calibration systems, owing to the performance of said 3D modeling.

Still another object of the invention is to propose a structure, which does not hinder for extended periods of time the operation of the liquid fuel station where the calibration is carried out and does not cause the station to suffer material loss, owing to the much faster performance of the calibration in a shorter time.

DESCRIPTION OF THE FIGURES

FIG. 1: Side view of the apparatus for forming the calibration chart for the underground tanks.

REFERENCE NUMBERS

1. Fuel Tank
2. Laser Distant Measurement Device
3. Ray of the Laser Device
4. Inclinometer
5. Motor A
6. Motor B
7. Hole
8. Control Unit
9. Surface
10. Band or Gear System A
11. Band or Gear System B
12. Manhole
13. Tank Cover
14. Main Shaft
15. Ground Zone
16. Connection Cables
17. The Steel Protective Pipe
18. Computer
X—The angle that might form because of the tank's being not perfectly parallel to the ground
A—Upward-Downward Rotation Axis of the Laser Device
B—Circular Rotation Axis of the Main Shaft

DETAILED DESCRIPTION OF THE INVENTION

The invention relates to the method and apparatus for forming the calibration chart used to measure the amount of fuel inside the fuel tanks (1).

In FIG. 1, a side view of the apparatus for forming the calibration chart used to measure the amount of fuel inside the fuel tanks (1) according to the invention is represented.

Said apparatus comprises the main components of the fuel tank (1) where the fuels are stored, the laser distance measurement device (2) located in said fuel tank (1), the inclinometer (4) that determines the angle between said tank and the ground, the main shaft (14) that provides said laser distance measurement device (2) with upward and circular movement, the motor A (5) that drives said main shaft (14) via band or gear system A (10), the motor B (5) that drives said main shaft (14) via band or gear system B (10), the control unit (8) that controls said apparatus and the computer (18) where the information coming out of said control unit (8) are collected and the calibration chart is prepared.

The method for forming the calibration chart used to measure the amount of fuel inside the fuel tanks (1) comprises the following steps:

Rotating via at least one main shaft (14) the laser distance measurement device (2) located inside the fuel tank (1) up to 360 degrees in circular direction of B and up to 270 degrees in the upward-downward direction of A, and determining its distance from the inner walls of said fuel tank (1) for separate points, with the help of the ray (3) of the laser device, determining via at least one inclinometer (4) the angle X between said fuel tank (1) and the plane on which it is located, transmitting the distance values between the laser distance measurement device (2) and the inner wall of the fuel tank (1) measured at separate points and the value of the angle X as measured by the inclinometer (4) to the computer, via at least one control unit (8) and forming the calibration chart using the obtained distance values and the value of the angle X.

The calibration chart is prepared by means of the formation of the 3D (three dimensional) space points via laser measurement inside said fuel tank (1) and of 3D modeling of the inside of the tank.

The height information obtained from level measurement sensors using different measurement techniques (magnetostrictive, ultrasonic, capacitive, etc.) indicates only the height of the liquid in mm from the bottom point of the tank.

Said apparatus, just as in a liquid level probe, is extended into the tank (1) preferably through a 2-inch hole (7) and again as in the liquid level probe, it is passed through said hole (7) and is mounted to the fuel tank (1).

Said main shaft (14) is passed through the manhole (12) and then said hole (7) located on the tank cover (13), and is thus inserted to the fuel tank (1). The steel protective pipe (17) is positioned about the main shaft (14), in order to increase the strength of said main shaft (14) and protect the same against the external effects.

The fuel tank (1) is positioned inside a ground zone (15) at an angle of X with respect to ground.

The inclinometer (4) located on the extension of the apparatus remaining above the surface (9) is positioned to calculated the inclination angle of X of the tank (1) or the connection point, if any. This information is later used for 3D calculations. Since the motor may not be inserted into the fuel tank (1), two servo motors (5, 6) are located on the top section of the surface (9).

The movements of said motors (5, 6) are transmitted to the laser distance measurement device (2) located inside said fuel tank (1) via main shaft (14). When said apparatus starts to operate, the main shaft (14) moves through 0 to 360 degrees in the direction of B. Said main shaft (14) performs said circular movement via the band or gear system A (10), owing to the drive it receives from the motor A (5).

Similarly, the laser distance measurement device (2) moves preferably through 0 to 270 degrees in the direction of A. Said laser measurement device (2) provides said upward-downward movement owing to the band or gear system B (11) moving the main shaft (14) up and down by the drive received from the motor B (6).

Thus the laser distance measurement device (2) measures the distance from the point it is located to various points along the inner wall of the tank (1) up to 360 degrees in the horizontal and 270 degrees in the vertical position, with the help of the ray (3) of the laser device.

Said distance measurements carried out many times to different points are collected in a computer (18) and analyzed to calculate the actual 3 dimensional shape of the tank. Moreover, the value of X showing the inclination of the tank (1) or the connection point with respect to the ground, if any, is also used during these calculations.

The reason is that the liquid inside the tank to be measured always stands perpendicularly to the gravitational axis of the earth. In other words, if there is an angle (1) in the tank, the liquid would stay parallel to the ground plane, not to the tank (1).

The control of the aforesaid apparatus may be provided via at least one control unit (8). The control unit (8) communicates the measurements conducted by said laser distance measurement device (2) and the inclinometer (4) to at least one computer (18), via the connection cables (16).

Once all the data collection procedures are complete, said apparatus is taken out of the fuel tank and the liquid level measurement probe is fitted in its place. The obtained data are converted to the calibration chart in the computer environment and now it is possible to convert the height data coming from the liquid level probe into the liquid volume information.

According to a different embodiment of the invention, the ultrasonic sensor is used as the laser distance measurement device (2).

According to a different embodiment of the invention, the ultraviolet sensor is used as the laser distance measurement device (2).

According to a different embodiment of the invention, the ultra wide band sensor is used as the laser distance measurement device (2).

According to a different embodiment of the invention, the position of said laser distance measurement device (2) in the apparatus may be changed and it may be fixed to an upper position (so that the direction of the laser light is downwards). Similar to the movement capability of said laser distance measurement device (2), a mirror set is used, which is moved along with the apparatus. In this way, the distance is measured by way of reflection from the mirror having the same movement capability, instead of the sensor moving itself.

The protective scope of this application is determined in the section of claims and the scope may by no means be limited to the description above provided only for exemplary purposes. It is obvious that a person skilled in the art may provide the innovation put forward by the invention also by using the similar embodiments and/or apply this embodiment to other fields with similar purpose used in the relevant art. Consequently, such embodiments would obviously lack the criteria of innovative step.

The invention claimed is:

1. A method for determining calibration charts used to determine a level and amount of fuel inside underground fuel tanks (1) at gas stations comprising the steps of:
   rotating a laser distance measurement device (2) located inside an empty underground fuel tank (1) via at least one main shaft (14), said rotation being up to 360 degrees in circular direction of B and up to 270 degrees in the upward-downward direction of A,
   determining distances of the laser distance measurement device (2) from inner walls of said fuel tank (1) for separate points by use of a ray (3) of the laser device,
   determining an angle X between said fuel tank (1) and a horizontal plane via at least one inclinometer (4),
   transmitting the determined distances between the laser distance measurement device (2) and the inner walls of the fuel tank (1) measured at separate points and the angle X as measured by the inclinometer (4) to a computer (18) via at least one control unit (8) and
   determining by the computer (18) the calibration chart of the fuel tank (1) using 3D three dimensional) space points determined from the transmitted distances and the angle X along with 3D (three dimensional) modeling of the inside of the tank.

2. An apparatus for determining the calibration charts used to determine a level and amount of fuel inside a fuel tank (1) placed in the ground at a gas station, comprising:
   at least one distance measurement device (2) positioned inside an empty underground fuel tank (1) and adapted to measure the distance between said distance measurement device and the inner wall of said fuel tank (1) at separate points;
   at least one main shaft (14) supporting said distance measurement device (2) with rotational movement circularly in a direction of B through up to 360 degrees and in an upward-downward direction of A through up to 270 degrees; and
   at least one inclinometer (4) positioned on the ground (9) and adapted to measure angle X between said fuel tank (1) and a horizontal plane; and
   a computer for determining the calibrations charts using 3D (three dimensional) space points based on the distances determined by the distance measurement device (2) and the angle X measured by the inclinometer (4) along with 3D (three dimensional) modeling of the inside of the tank.

3. A method for determining the calibration charts according to claim 1 characterized in that the main shaft (14), which rotates the laser distance measurement device (2) through up to 360 degrees in the circular direction of B is driven by at least one band or gear system A (10).

4. A method for determining the calibration charts according to claim 3 characterized in that said band or gear system A (10) is driven by at least one motor A (5).

5. A method for determining the calibration charts according to claim 1 characterized in that the main shaft (14), which rotates the laser distance measurement device (2) through up to 270 degrees in the upward-downward direction of A receives said upward-downward movement from at least one band or gear system B (11).

6. A method for determining the calibration charts according to claim 1 characterized in that said main shaft (14) comprises at least one band or gear system B (11) located on above ground, said one band or gear system B (11) providing the laser distance measurement device (2) with rotational movement through up to 270 degrees in the upward-downward direction of A, wherein said band or gear system B (11) is driven by at least one motor B (6).

7. A method for determining the calibration charts according to claim 1 further comprising the steps of:
   moving said laser distance measurement device (2) to a fixed upper position with laser light directed downwards and
   moving at least one mirror set to direct the laser light to said separate points.

8. An apparatus for determining the calibration charts used to determine a level and amount of fuel inside a fuel tank (1) placed in the ground at a gas station, comprising:
   at least one laser distance measurement device (2) positioned inside an empty underground fuel tank (1) and adapted to measure the distances between said laser distance measurement device and the inner walls of said fuel tank (1) at separate points;
   at least one main shaft (14) supporting said distance measurement device (2) with rotational movement circularly in a direction of B through up to 360 degrees and in an upward-downward direction of A through up to 270 degrees;
   at least one inclinometer (4) positioned on the ground (9) and adapted to measure angle X between said fuel tank (1) and a horizontal plane; and
   a computer for determining the calibration charts using 3D (three dimensional) space points based on the distances determined by the distance measurement device (2) and the angle X measured by the inclinometer (4) along with 3D (three dimensional) modeling of the inside of the tank.

9. An apparatus for determining the calibration charts according to claim 8 further comprising at least control unit (8) located above ground (9) adapted to communicate the value of the angle X measured by said inclinometer (4) and the distances measured by said laser distance measurement device (2) to the computer (18).

10. An apparatus for determining the calibration charts according to claim 8 characterized in that said main shaft (14) comprises at least one band or gear system A (10) located above ground (9) and adapted to rotate the laser distance measurement device (2) through up to 360 degrees in the circular direction of B.

11. An apparatus for determining the calibration charts according to claim 8 characterized in that said main shaft (14) comprises at least one band or gear system B (11) located above ground (9) and adapted to rotate the laser distance measurement device (2) through up to 270 degrees in the upward-downward direction of A.

12. An apparatus for determining the calibration charts according to claim 10 further comprising at least one motor A (5) positioned above ground (9), which drives said band or gear system A (10).

13. An apparatus for determining the calibration charts according to claim 11 further comprising at least one motor A (6) positioned above ground (9), which drives said band or gear system B (11).

14. An apparatus for determining the calibration charts according to claim 8 further comprising at least one hole (7) through said tank (1) enabling said main shaft (14) to pass into said fuel tank (1) and accommodating said main shaft (14).

15. An apparatus for determining the calibration charts according to claim 8 further comprising at least one steel protective pipe (17) around said main shaft (14) adapted to increase the strength of said main shaft (14) and protect the main shaft against external effects.

16. An apparatus for determining the calibration charts according to claim 2, wherein an ultrasonic sensor is used as said distance measurement device (2).

17. An apparatus for determining the calibration charts according to claim 2, wherein a microwave sensor is used as said distance measurement device (2).

18. An apparatus for determining the calibration charts according to claim 2, wherein an ultra wide band sensor is used as said distance measurement device (2).

19. An apparatus for determining the calibration charts according to claim 2, wherein a radar sensor is used as said distance measurement device (2).

\* \* \* \* \*